Oct. 26, 1965 P. B. SHUTT ETAL 3,213,626
MASTER CYLINDER RESERVOIR CONNECTION
Filed Sept. 23, 1964
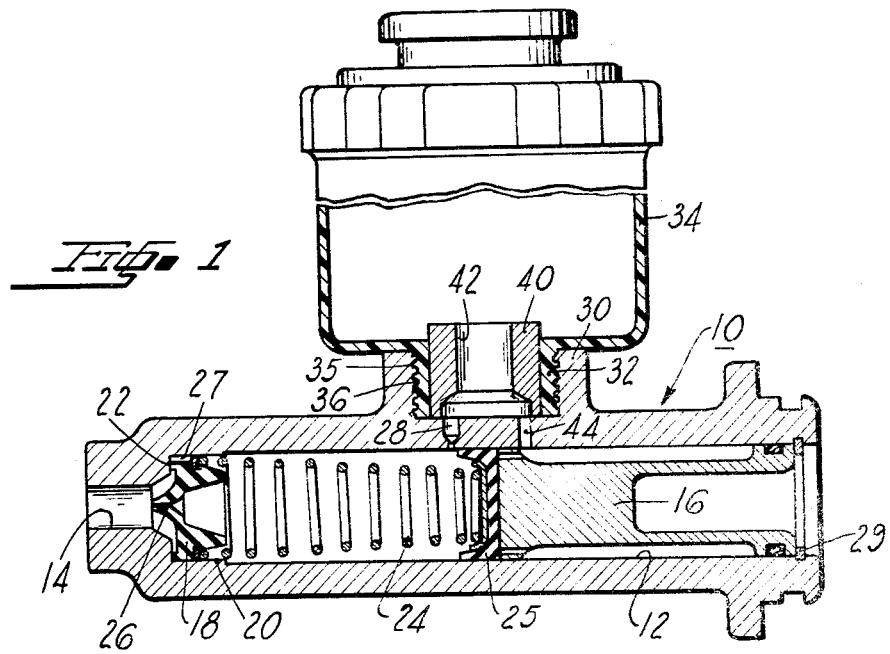
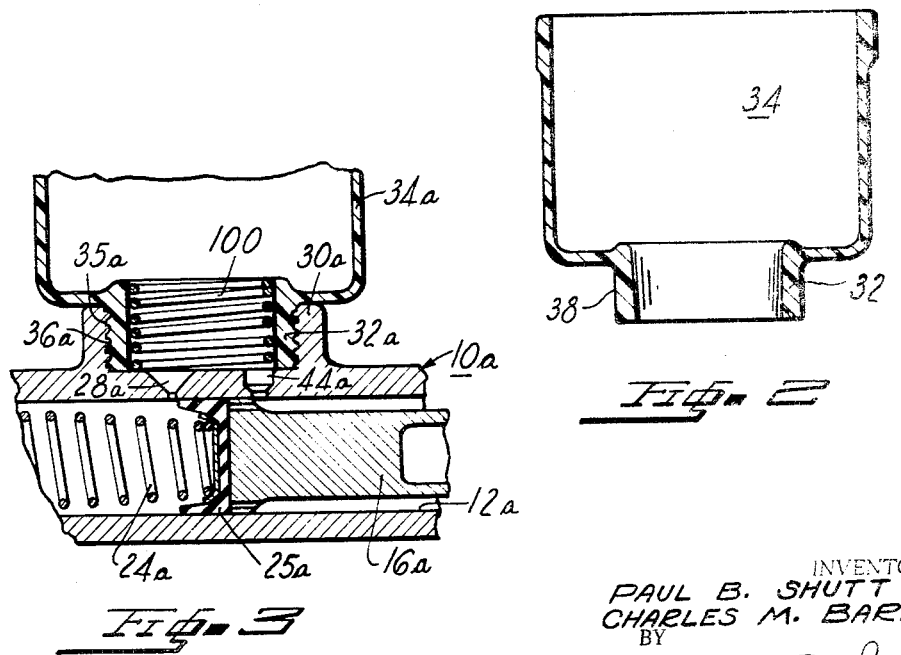
INVENTORS
PAUL B. SHUTT
CHARLES M. BARNES
BY
Sheldon F. Raizes
ATTORNEY United States Patent Office 3,213,626
Patented Oct. 26, 1965

3,213,626
MASTER CYLINDER RESERVOIR CONNECTION
Paul B. Shutt and Charles M. Barnes, both of St. Joseph, Mich., assignors to The Bendix Corporation, Lakeshore, St. Joseph, Mich., a corporation of Delaware
Filed Sept. 23, 1964, Ser. No. 398,516
9 Claims. (Cl. 60—54.6)

This invention relates to a connection between a master cylinder casting and its reservoir.

An object of this invention is to provide a master cylinder with a reservoir which is of different material than the master cylinder, wherein the connection of the reservoir to the master cylinder is simple, easy to assemble, and fluid tight.

Other objects of the invention will become apparent from the following description with reference to the drawings wherein:

FIGURE 1 is a sectional view of one embodiment of a master cylinder and a reservoir assembly;

FIGURE 2 is a view of the reservoir prior to assembly; and

FIGURE 3 is a sectional view of another embodiment of a master cylinder and a reservoir assembly.

Referring to FIGURE 1, there is illustrated a master cylinder casting 10 comprising a bore 12 having a fluid outlet port 14 at one end thereof and a slidable actuating piston 16 therein at the other end thereof. A residual pressure valve 18 is also located in the bore and has an annular surface 20 biased against an annular seat 22 by a spring 24 and permits fluid displaced by the piston 16 to flow between a split lip 26 during actuation of the master cylinder and upon the return stroke of the piston 16 is unseated against the force of the spring 24 to permit return fluid to pass through openings 27 in the outer peripheral edge of the valve member 18. A lip seal 25 is provided on the advanced end of the piston 16 for closing off the compensating port 28 during actuation of the master cylinder. The spring 24 is compressed between the seal 25 and the valve member 18 to hold the seal in engagement with the piston and to return the piston to its normal position against a stationary snap ring 29, in addition to seating the valve member 18.

A female annular flange 30 is integral with the casting 10 and receives therein an annular male flange 32 of a fluid reservoir 34. The reservoir may be of any suitable material although plastic is preferred and illustrated. The internal surface of the female flange 30 has a plurality of concentric saw teeth 35 defining grooves 36 therebetween and the outer surface 38 of the male flange 32 is smooth prior to assembly as shown in FIGURE 2. An annular tapered plug 40 is driven into and maintained in the opening formed by the flange 32 producing a wedging action on the wall of the flange 32 for expanding the same into the inner surface of the female flange 30 resulting in the teeth 35 digging into the outer surface 38 of the male flange 32 and the flange 32 deforming into the grooves 36. The plug 40 has a central port 42 therein communicating the reservoir with the compensating port 28 and a replenishing port 44 which are in turn communicated to the bore 12.

The force produced by the wedging action of the plug is ordinarily strong enough to cause enough friction between the flanges to prevent withdrawal of the reservoir flange from the casting flange if the surfaces were smooth. However, the provision of saw teeth places the corresponding portions on the male flange 32 in shear to produce a stronger connection of the reservoir to the casting.

Referring to FIGURE 3, those elements which are similar to the elements of the embodiment of FIGURE 1 are designated with the same reference numerals, only with an "a" affixed thereto. In this embodiment, a radially expanding coil spring 100 is substituted for the plug 40 of the previous embodiment. The normal diameter of the coil spring 100 is greater than the inner diameter of the wall of the male flange 32a, resulting in the spring 100 being stressed within the flange 32a to force the outer surface thereof into the inner surface of the female flange 30a, whereby the teeth or ridges 35a dig into the outer surface of the plastic male flange 32a.

In each embodiment the force exerted by either the plug 40 or the coil spring 100 is designed to be strong enough to effect a fluid type connection between the casting flange and the reservoir flange.

While the invention has been described in considerable detail, we do not wish to be limited to the particular constructions shown and described; and it is our intention to cover hereby all equivalent constructions which come within the scope of the following claims:

1. A master cylinder, reservoir assembly comprising: a body member and a hollow reservoir member, said reservoir member having an open portion at the bottom thereof, said body member having a fluid actuating chamber therein, an opening in said body member receiving said portion of said reservoir member therein, said portion of said reservoir member being flexible, means engaging the inner surface of the wall of said reservoir portion pressing the outer surface thereof against the wall of said opening thereby securing said reservoir to said body member, and passage means in said body member communicating said reservoir to said actuating chamber.

2. The structure as recited in claim 1 wherein said means for pressing said reservoir portion against the wall of said opening is resilient.

3. The structure as recited in claim 1 wherein said means for pressing said reservoir portion against the wall of said opening comprises a coiled member arranged in said reservoir portion so that it is radially confined therein to press said reservoir portion against the wall of said opening.

4. The structure as recited in claim 1 wherein said means pressing said reservoir portion against the wall of said opening comprises a plug engaging the inner surface of said reservoir portion, said plug having an opening therein communicating the interior of said reservoir with said passage means.

5. A master cylinder, reservoir assembly comprising: a body member having a fluid actuating chamber therein, an annular female flange thereon, a reservoir member having a flexible male annular flange at one end thereof extending into said female flange, means engaging the inner surface of the wall of said male flange pressing the outer surface thereof into engagement with the inner surface of the wall of said female flange whereby said reservoir member is secured to said body member, and passage means in said body member communicating said reservoir to said fluid chamber.

6. The structure as recited in claim 5 wherein said means engaging the inner surface of the wall of said male flange is resilient.

7. The structure as recited in claim 5 wherein said means for pressing said male flange into engagement with the wall of said female flange comprises a coiled member arranged in said male flange so that it is radially confined therein to press said male flange against the wall of said female flange.

8. The structure as recited in claim 5 wherein said means for pressing said male flange in engagement with the female flange is a plug having an opening therein communicating the interior of said reservoir with said passage means.

9. The structure as recited in claim 5 wherein said means engaging the inner surface of the wall of said male flange pressing the outer surface of said male flange into engagement with the wall of said female flange comprises radially confined spring means.

References Cited by the Applicant

UNITED STATES PATENTS 2,902,298   9/59   Kolthoff.

JULIUS E. WEST, *Primary Examiner*.